No. 730,484. PATENTED JUNE 9, 1903.
C. H. SEITZ.
AUTOMATIC AIR BRAKE COUPLING.
APPLICATION FILED DEC. 15, 1902.
NO MODEL.

Inventor
C. H. Seitz

No. 730,484. Patented June 9, 1903.

UNITED STATES PATENT OFFICE.

CLINTON H. SEITZ, OF SHREWSBURY, PENNSYLVANIA.

AUTOMATIC AIR-BRAKE COUPLING.

SPECIFICATION forming part of Letters Patent No. 730,484, dated June 9, 1903.

Application filed December 15, 1902. Serial No. 135,272. (No model.)

*To all whom it may concern:*

Be it known that I, CLINTON H. SEITZ, a citizen of the United States, residing at Shrewsbury, in the county of York and State of Pennsylvania, have invented a new and useful Automatic Air-Brake Coupler, of which the following is a specification.

My invention is an improved device for automatically coupling air-brakes, and is an improvement on the automatic coupler for which Letters Patent of the United States were issued to me June 3, 1902, No. 701,628, to which reference is had, especially as to the construction of the parts marked A and B.

The object of my improvement is to provide a guide by which a plurality of pipes may be connected, each pipe on one car alining perfectly with the proper pipe on the adjacent car.

Figure 1:
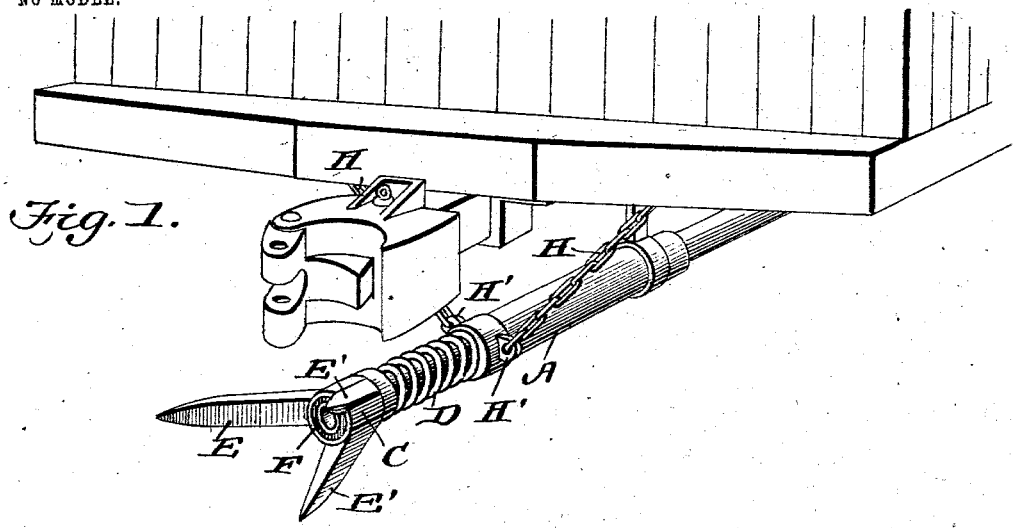
Figure 2:
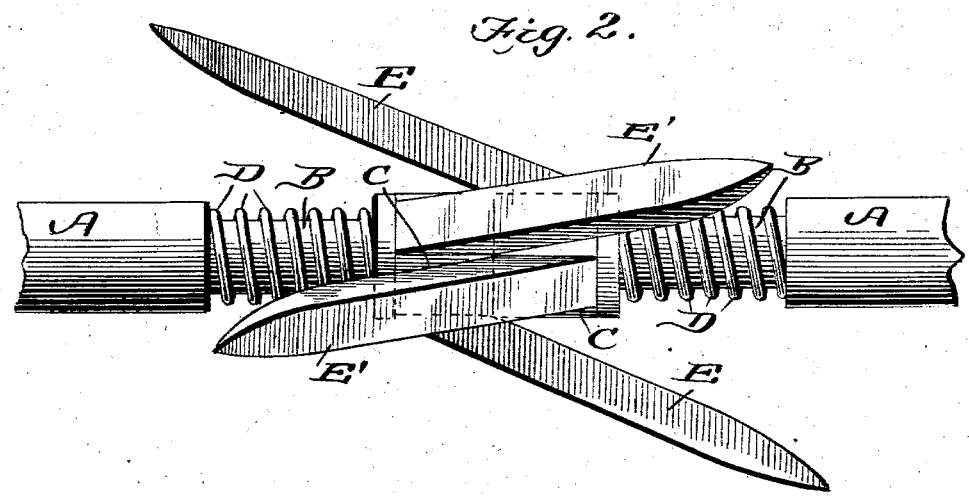
Figure 3:
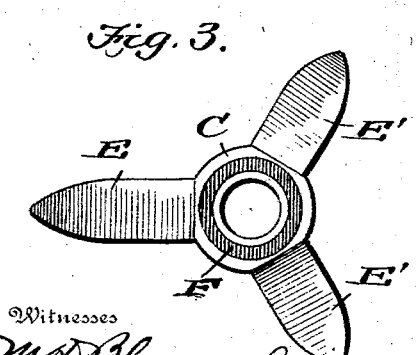
Figure 4:
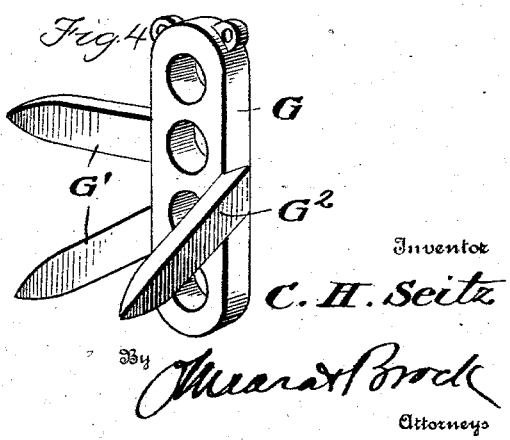

In the accompanying drawings, Figure 1 is a perspective view of one of my couplers in position on a car. Fig. 2 is a detail plan view of two couplers, the guides interlocking. Fig. 3 is a detail end view. Fig. 4 is a detail view showing arrangement of the guides when a plurality of pipes are to be connected.

In carrying out my invention I employ the pipe A, connected to the train-pipe at its rear end, a pipe B, secured in the pipe A and projecting outwardly from its forward end. A coupling-head C is slidably secured on the pipe B, and a spring D is coiled around the pipe B and bears at one end against the forward end of the pipe A and at the opposite end against the inner end of the coupling-head, tending to hold the head at the extreme outer end of the pipe B, the head normally projecting slightly in advance of said pipe.

Guide-prongs E E', integral with the head, project in advance of it and diverge, the guides being tapered toward their ends.

The guides are similar in size and shape on both connecting coupler-heads, but are differently arranged, the guides on one head consisting of the two short prongs E', carried on one side of the head and extending outwardly, and the long prong E, extending outwardly from the opposite side of the head. On the contacting coupler the position of the prongs is reversed, the long prong E being on the opposite side of the coupler and passing between the short prongs of the first-mentioned coupler. When two such couplers contact, the prong E of each coupler will pass between the prongs E' of the other coupler, and these prongs will permit limited lateral movement of one coupler-head relative to the other, will allow a certain amount of twisting motion in rounding curves, and will also permit the pipes to be coupled up on a curve as well as on a straight track. A rubber facing F is secured to each head, thereby insuring a tight joint.

Where a plurality of pipes are to be coupled, the coupling-head is elongated, as shown at G in Fig. 4, and is provided with a plurality of openings one above the other, each adapted to receive the outer end of a pipe similar to the pipe B, and on its one side carries the forwardly and outwardly projecting prongs G' and on its opposite side the oppositely and projecting prongs G², it being understood, of course, that the coacting coupler on the other car is reversed, though the construction is the same. These couplings may be secured to the car in any desired manner; but I have shown one as suspended below the car-coupler by the chains H, attached to ears H', formed on the pipe A.

It will be seen that by this construction several pipes can be coupled with one set of coupling-heads.

Having thus fully described my invention, what I claim as new, and desire to secure by Letters Patent, is—

1. An air-brake coupler, comprising two coupler-heads, one of said heads having two outwardly-projecting prongs on one side, an outwardly-projecting longer prong on the opposite side, and the coacting coupler having prongs adapted to pass between the prongs of the first-mentioned coupler.

2. An air-brake coupler comprising two coupler-heads having adjacent diverging prongs, and a longer forwardly-projecting prong on the opposite side of the head, the prongs on the said coupler being adapted to interlock.

CLINTON H. SEITZ.

Witnesses:
C. E. DISE,
F. W. BROWN.